Oct. 10, 1933.  R. B. LUEBBE  1,930,451
METAL JOINT
Filed June 2, 1931

INVENTOR
Raphael B. Luebbe
BY
Wood & Wood ATTORNEYS

Patented Oct. 10, 1933

1,930,451

UNITED STATES PATENT OFFICE 1,930,451

METAL JOINT

Raphael B. Luebbe, Cincinnati, Ohio, assignor to International-Stacey Corporation, Columbus, Ohio, a corporation of Ohio Application June 2, 1931. Serial No. 541,647

6 Claims. (Cl. 220—75)

This invention relates to improvements in metal joints primarily used in connection with gas holders, wherein it is necessary that the joints or splices at the abutting edges of the plates be effectively sealed against the escape of gas.

It is an object of this invention to provide a new and improved metal joint which is sealed by means of a soft metal insert fastened into position by the plate jointing means and swaged or formed after the parts are joined and thereby spread into the joint or crevice for effectively filling and sealing the same. The principal reason why the problem arises in this connection is that it is highly impractical from the manufacturing standpoint and almost impossible to grind the abutting edges of the plates in such fashion that they make a perfect line abutment and there is bound to be a noticeable crevice due to failure to abut at some points along the joint. By the use of this invention it is possible to supply the plates with the edges rough cut and to fasten them together without grinding or finishing.

Other objects and certain advantages will be more fully apparent from a description of the accompanying drawing, in which.

The environment in which the sealed joint of this invention is largely used is that of gas holders wherein for example a large number of metal plates are joined or spliced to form a large circular shell, these plates being relatively heavy and the joints necessarily numerous due to the extreme sizes of the gas holders or tanks.

In the operation of building the holder shell, the plates are joined or rigidly attached by means of splice plates preferably angle iron or some reinforced bar construction such as will present a flat surface upon which the adjacent margins of the plate may be attached. It is of great advantage both as to economy in furnishing the plates and as to efficiency in joining the same that the edges be left unfinished, that is, rough cut and not ground. This mode of plate finish is also the direct result of the fact that it is substantially impossible and not feasible from the manufacturing standpoint, to finish the extensive edges of the plates so that perfect line abutment therebetween may be obtained.

Figure 1:
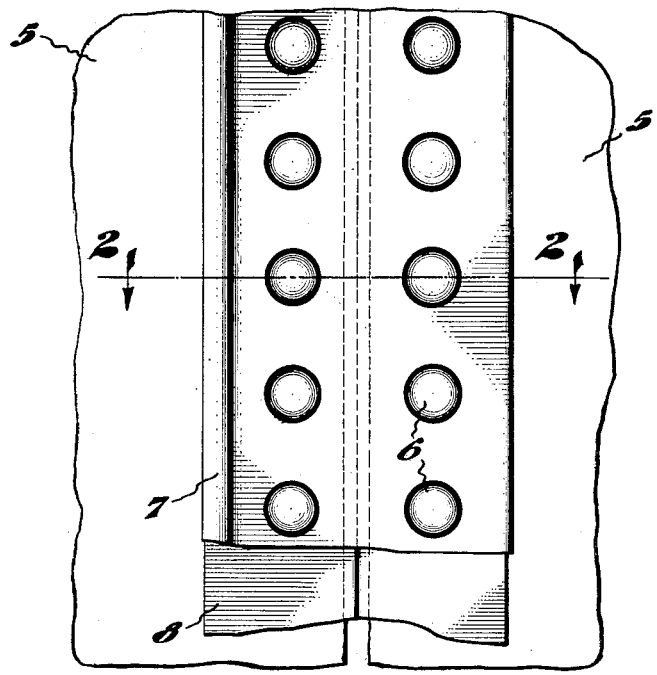
Figure 1 is a fragmentary front view of a section of a joint, certain portions of the attaching and sealing parts being broken away for more fully illustrating the relation of the parts.
Figure 2:
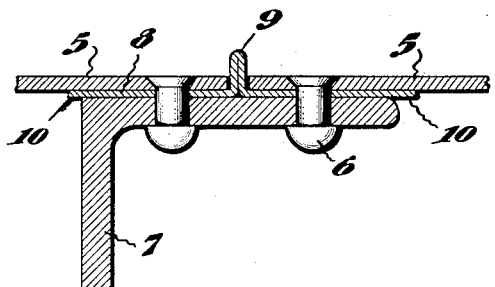
Figure 2 is a sectional view taken on line 2—2, Figure 1, showing the soft metal insert in position prior to operation thereon for swaging or spreading the same to seal the joint crevice.

Referring to the drawing specifically which illustrates a short section of the improved splice or joint, it will be observed that the plates 5 are secured by rivets 6 to the splice or tie plate 7 of angle form with their adjacent edges separated by means of a sealing or caulking strip 8 of soft material and preferably slightly clear of contact with the strip as initially placed when the parts are riveted together (see Figure 2).

The strip 8 is formed into special shape out of soft flat plate material having sufficient ductility to swage or deform relatively easily when cold. The flat stock is crimped centrally to provide a rib 9 running longtiudinally of the strip and of double plate thickness. When the plates are initially attached together by riveting to the splice bar the soft metal strip is secured upon the face of the bar between the bar and the plates with the rib lying in the intended crevice between the plate edges and extending through and beyond the same.

Two pieces of flat stock may be used in lieu of the integral strip 8, each bent to form an L-shaped section with the short legs abutting to form the rib 9 or the strip may be formed by casting, rolling, drawing, etc., for simultaneously forming the strip and rib.

When the rivets have been set the major portion of the safe metal plate functions as a gasket between the parts and a moderately efficient seal. Thereafter, to effectively close the crevice and contiguously join the plates, to present a flush surface for the holder shell since it is inherent that certain parts of the holder mechanism must slide smoothly thereover, and to seal the splice, the rib is swaged or deformed into the crevice by any means suitable for this purpose, preferably by rolling. Enough metal mass is included in the rib to entirely and evenly fill the joint crevice in the perfect operation although it may be appreciated that an excess could be readily ground away after swaging to make the structure entirely flush across the joint.

Figure 3:
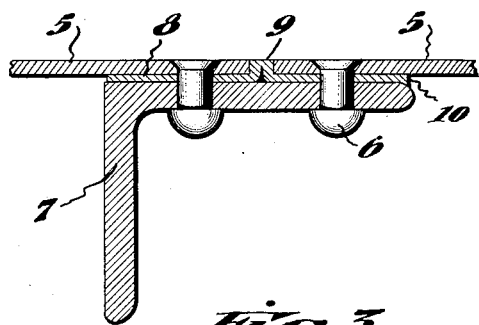
Figure 3 is a view taken similar to Figure 2 illustrating the joint completed and the soft metal seal in position after it has been swaged into place for sealing the joint.

To fully insure the provision of a perfectly sealed leakproof joint it is provided that the soft metal plate initially extends slightly beyond the edges of the splice bar as at 10 (see Figure 2). Thereafter in the sealing operation the excess or extended metal portions are peened or toed in under the splice bar as shown in Figure 3 to fill any recesses or irregularities along the adjacent faces of plates and splice bar at the edge of the bar, thereby providing for the joint, in combination with the soft material spread in the crevice, a double line seal against gas leakage plus the seal afforded by the soft metal gasket lying between the plates and splice bar.

The described form of joint is intended for any use where it is necessary to seal metal part splices.

Having described my invention, I claim:

1. In a plate attaching means, a splice plate connecting adjacent plates and disposing their edges in proximity, and a soft metal strip secured between the splice plate and the connected plates and having a portion disposed between the adjacent edges of the plates and adapted to be spread thereinto for filling out the crevice and sealing the same.

2. In a plate attaching means, a splice strip connecting the adjacent plates and disposing their edges in proximity, and a soft metal strip secured between the splice strip and plates and having a rib disposed between and beyond the adjacent edges of the plates and of enough mass adapting it to be spread thereinto to fill out and seal the crevice.

3. In a splice for plates, a splice strip connecting said plates, said plate edges adjacently disposed medially along said splice strip, and a ductile metal strip secured between the plates and the splice strip, said ductile strip including a central rib disposed in the crevice between the plate edges and deformed therein for sealing the plate edge abutment at the crevice.

4. In a splice for plates, a splice strip connecting said plates, said plate edges adjacently disposed medially along said splice strip, and a ductile metal strip secured between the plates and the splice strip, said ductile strip having portions, initially extended beyond the edges of the splice strip, peened in between the splice strip and plates for additionally sealing the splice at these points.

5. In a splice for plates, a splice strip connecting said plates, said plate edges adjacently disposed medially along said splice strip, and a ductile metal strip secured between the plates and the splice strip, said ductile strip including a central rib disposed in the crevice between the plate edges and deformed therein for sealing the plate edge abutment at the crevice, said ductile strip having portions, initially extended beyond the edges of the splice strip, peened in between the splice strip and plates for additionally sealing the splice at these points.

6. A butt joint for metal plates, comprising, a pair of plates, a tie plate fixed to one side of said plates for joining the same, and a calking sheet of ductile metal interposed between joint surfaces of said plates and tie plate and compressed between the butt ends of the joined plates.

RAPHAEL B. LUEBBE.